United States Patent [19]

Brugel

[11] Patent Number: 5,208,290

[45] Date of Patent: May 4, 1993

[54] EPOXY RESIN CROSSLINKED WITH POLYAMINE AND CHLOROSULFONATED POLYOLEFIN

[75] Inventor: Edward G. Brugel, Wilmington, Del.

[73] Assignee: E. I. du Pont de Nemours and Company, Wilmington, Del.

[21] Appl. No.: 562,980

[22] Filed: Aug. 6, 1990

Related U.S. Application Data

[63] Continuation-in-part of Ser. No. 414,826, Sep. 29, 1989, abandoned.

[51] Int. Cl.$^5$ .................. C08L 23/34; C08L 63/02; C08L 63/04
[52] U.S. Cl. .................. 525/113; 106/287.28
[58] Field of Search .................. 52/113

[56] References Cited

U.S. PATENT DOCUMENTS

| | | | |
|---|---|---|---|
| 2,615,000 | 10/1952 | Bradley | 260/31.2 |
| 2,852,497 | 9/1958 | Thompson | 260/79.3 |
| 4,316,969 | 2/1982 | Koyama et al. | 525/145 |
| 4,513,060 | 4/1985 | Vasta | 428/416 |
| 4,515,917 | 5/1985 | Yamamoto et al. | 524/178 |
| 4,572,870 | 2/1986 | Vasta | 428/416 |
| 4,578,286 | 3/1986 | Vasta | 428/413 |
| 4,959,414 | 9/1990 | Nakagawa et al. | 523/435 |

FOREIGN PATENT DOCUMENTS

| | | |
|---|---|---|
| 1954701 | 5/1971 | Fed. Rep. of Germany . |
| 61-83216 | 4/1986 | Japan . |
| 0952111 | 3/1964 | United Kingdom . |

Primary Examiner—Robert E. Sellers
Attorney, Agent, or Firm—Marilyn H. Bromels

[57] ABSTRACT

A process for preparing a crosslinked epoxy resin composition which comprises contacting, at ambient temperature, in the absence of a bicyclic amidine:

a) 5-80% by weight, based on the total weight of the composition, of a chlorosulfonated olefin polymer having a chlorine content of about 20-60% by weight and a sulfur content of about 0.5-10% by weight; with b) 5-90% by weight, based on the total weight of the composition, of a polyamine wherein the equivalent ratio of the polyamine to sulfur in the chlorosulfonated olefin polymer is greater than 1:1 and the polyamine has an equivalent weight up to 5,000; and with c) at least 5% by weight, based on the total weight of the composition, of an epoxy resin prepolymer.

9 Claims, No Drawings

EPOXY RESIN CROSSLINKED WITH POLYAMINE AND CHLOROSULFONATED POLYOLEFIN

This is a continuation-in-part of U.S. application Ser. No. 07/414,826, filed Sep. 29, 1989, now abandoned.

BACKGROUND OF THE INVENTION

The chemical resistance, high adhesion, flame resistance, low shrinkage, and good mechanical properties of polyepoxy resin compositions have led to the widespread use of these resins as protective coatings, molding compositions, electrical laminates, high performance adhesives, and structural composites. Despite these excellent performance characteristics there is a need in the industry for improved polyepoxy resin compositions which have a greater degree of adhesion, flexibility, and weatherability. Chlorosulfonated olefin polymers are widely known and widely used elastomers which exhibit excellent resistance to acids, bases, and solvents, and which exhibit a high degree of flexibility, ozone resistance, and general overall weatherability as well as reduced surface tension. These properties are derived from the presence of chlorine on the polymer backbone. It would be impractical to chlorinate polyepoxy resins in an attempt to improve their properties. In an attempt to address this problem, U.S. Pat. Nos. 4,513,060 and 4,572,870 (Vasta) produced chlorosulfonated polyethylene/epoxy compositions and chlorosulfonated ethylene vinyl acetate/epoxy compositions using certain polyamine curing agents and bicyclic amidine compounds (the amidine being optional in the ethylene vinyl acetate composition, provided elevated temperatures are used). It has now been found that when chlorosulfonated polyolefins are reacted, at ambient temperatures, in the absence of bicyclic amidines, with polyamines or polyamides (or mixtures thereof), and the resultant intermediate is further reacted with an epoxy resin prepolymer, polyepoxy resins are obtained which exhibit improvements in adhesion, flexibility, and overall weathering while still retaining the desirable properties of conventional polyepoxy resins.

SUMMARY OF THE INVENTION

This invention is directed to a process for preparing crosslinked polyepoxy resin compositions having chlorosulfonated olefin polymer blocks incorporated therein.

More specifically this invention is directed to a process for preparing chlorosulfonated olefin polymer resin compositions which comprises reacting at ambient temperature, in the absence of a bicyclic amidine:

a) 10-80 % by weight, based on the total weight of the composition, of a chlorosulfonated olefin polymer having a chlorine content of about 20-60% by weight and a sulfur content of about 0.5-10% by weight; with b) 5-90% by weight, based on the total weight of the composition, of a polyamine or polyamide, wherein the equivalent ratio of the polyamine/polyamide to sulfur in the chlorosulfonated olefin polymer is greater than 1:1 and the polyamine/polyamide has an equivalent weight up to 5,000; and with c) at least 5% by weight based, on the total weight of the composition, of an epoxy resin prepolymer.

In the above embodiment of the process of this invention the reactants are each present at the initiation of the reaction. In another embodiment of the invention, the chlorosulfonated olefin polymer and the polyamine/polyamide may be pre-reacted to form a sulfonamide intermediate which is subsequently reacted with the epoxy resin prepolymer.

In a further embodiment of the invention a partially sulfonamidated chlorosulfonated olefin polymer derivative is formed by pre-reaction of a chlorosulfonated olefin polymer in which a portion of the reactive sulfonyl chloride groups of the chlorosulfonated olefin polymer have been derivatized or pre-reacted with a compound selected from the group consisting of monohydric alcohols and primary or secondary amines. The resultant chlorosulfonated olefin polymer is subsequently reacted with the polyamine/polyamide and the epoxy resin prepolymer to form a chlorosulfonated polyolefin resin composition of the invention. The amount of derivatizing agent may range from about 0.1 to about 1 equivalent, per equivalent of sulfur present in the chlorosulfonated olefin polymer. Use of monohydric alcohols in excess, to act as both solvent and reactant, is also contemplated by the invention.

Chlorosulfonated resin compositions are thus produced which are crosslinked polyepoxy resins. These polyepoxy resin compositions have improved physical and chemical properties which are imparted to them by incorporation of chlorosulfonated olefin polymers into the final resin product by first reacting the sulfonyl chloride moieties on the chlorosulfonated olefin polymers with an excess of a polyamine/polyamide, followed by reaction of the amino group or groups remaining after the initial reaction with the epoxy resin prepolymer. Depending on the particular chlorosulfonated polymer chosen and its amount relative to the epoxy resin components the chlorine content varies, thus influencing the final properties of the chlorine-containing polyepoxy resin compositions of this invention. Use of chlorosulfonated polyolefins containing low levels of chlorine, about 30-35 weight %, produces rubbery, non-crystalline blocks which can increase the toughness, elongation, and flexibility of the cured epoxy resin product. Higher chlorine levels, about 50-60 weight %, increase the glass transition temperature of the chlorosulfonated olefin polymer block, thus increasing the hardness and the barrier properties of the final crosslinked polyepoxy resin. Incorporation of the chlorosulfonated olefin polymer into the resin means that the polymer is chemically a part of the polyepoxy resin structure. As such the polymer forms a block or blocks in the structure, in the same manner as do the components derived from the epoxy resin prepolymer and the polyamine/polyamide. The polyepoxy and polyamine/polyamide blocks correspond to the residues of these components after reaction. Thus, the resin compositions are crosslinked polyepoxy resin compositions having chlorosulfonated olefin polymers incorporated therein through sulfonamide linkages.

DETAILED DESCRIPTION OF THE INVENTION

The polyepoxy resin compositions produced by the process of the invention comprise blocks derived from chlorosulfonated olefin polymer, blocks derived from polyamine/polyamide, and blocks derived from epoxy resin prepolymer. Said resins contain 10-80% by weight, based on the weight of the resin, of chlorosulfonated olefin polymer-derived blocks linked via sulfonamide groups, the polyamine/polyamide-derived block comprising 5-90% by weight based on the weight of the resin, and the block derived from the epoxy resin prepolymer comprising at least 5% by weight, based on the weight of the resin. Thus, they are crosslinked compositions.

The term chlorosulfonated olefin polymer as used herein means those chlorosulfonated olefin polymers which contain chlorine in amounts ranging from 20–60 weight % and sulfur in amounts ranging from 0.5–10 weight %, preferably 1–3 weight %, based on the weight of the chlorosulfonated olefin polymer. The chlorosulfonated olefin polymers may be selected from the group consisting of chlorosulfonated homopolymers of $C_2$–$C_8$ alpha monoolefins and chlorosulfonated copolymers of ethylene and at least one ethylenically unsaturated monomer selected from the group consisting of $C_3$–$C_{10}$ alpha monoolefins, $C_1$–$C_{12}$ alkyl esters of unsaturated $C_3$–$C_{20}$ monocarboxylic acids, unsaturated $C_3$–$C_{20}$ mono-or dicarboxylic acids, vinyl esters of saturated $C_2$–$C_{18}$ carboxylic acids, and carbon monoxide. These chlorosulfonated olefin polymers include chlorosulfonated polyethylene, chlorosulfonated polypropylene, chlorosulfonated ethylene/vinyl acetate copolymers, chlorosulfonated ethylene acrylic acid copolymers, chlorosulfonated ethylene methacrylic acid copolymers, chlorosulfonated ethylene methyl acrylate copolymers, chlorosulfonated ethylene methyl methacrylate copolymers, chlorosulfonated ethylene n-butyl methacrylate copolymers, chlorosulfonated ethylene glycidyl methacrylate copolymers, and chlorosulfonated copolymers of ethylene with propylene, butene, 3-methyl-1-pentene, or octene. Preferred chlorosulfonated olefin polymers are chlorosulfonated polyethylene and chlorosulfonated copolymers of ethylene and vinyl acetate.

The chlorosulfonated olefin polymers have average molecular weights within the range of 1,000 to 300,000. Those chlorosulfonated olefin polymers having average molecular weights of 1,000–50,000 are suitable for preparation of epoxy resin compositions for high solids coating applications, with the preferred average molecular weight being 1,000 to 5,000. Chlorosulfonated polyolefins having average molecular weights in the range of 50,000 to 300,000 are most suitable for preparation of epoxy resin compositions for adhesive and thermoset applications, with the preferred average molecular weight being 75,000 to 150,000.

The chlorosulfonated olefin polymers used to prepare the resins may themselves be prepared by reacting an alpha monoolefin polymer with a chlorosulfonating agent at temperatures of about 80°–100° C., usually in the presence of a free radical initiator and an inert solvent. A typical chlorosulfonating agent is sulfonyl chloride and a typical initiator is 2,2'-azobis(2-methylpropane nitrile). Various chlorosulfonated olefin polymers and methods for their preparation are discussed, for example, in U.S. Pat. Nos. 2,586,363, and 3,296,222 and European Patent Application 0163970 which are incorporated herein by reference.

The term polyamine as used herein means those aliphatic and aromatic amines having two or more primary or secondary amino functionalities per molecule. The term as used herein also encompasses those polyamines which have at least two primary or secondary amino moieties and which are formed by condensation reactions of aliphatic or aromatic amines having two or more primary or secondary amino functionalities per molecule with saturated aliphatic polycarboxylic acids, with cycloaliphatic polycarboxylic acids, or with aromatic polycarboxylic acids. Examples of polyamines that can be used to prepare the resin compositions of the present invention include, among others, isophoronediamine, hexamethylenediamine, ethylenediamine, 1,4-cyclohexanebis(methylamine), 1,2-diaminopropane, propylenediamine, diethyl ether diamine, trimethylhexamethylmethylenediamine, methanediamine, 4,4'-methylenebisaniline, triethylenetetramine, diethylaminopropylamine, diethylenetriamine, and N-aminoethylpiperazine. The preferred polyamine is isophoronediamine. Polyamine condensation products that can be used are condensation products of polyamines with saturated aliphatic, cycloaliphatic, or aromatic polycarboxylic acids. Examples of such acids include adipic, azelaic, phthalic, isophthalic and succinic acids. The preferred condensation products are reaction products of isophoronediamine, hexamethylenediamine, ethylenediamine, 1,4-cyclohexanebis(methylamine), 1,2-diaminopropane, propylene diamine, diethyl ether diamine, trimethylhexamethylmethylenediamine, methanediamine, 4,4'-methylenebisaniline, triethylenetetramine, diethylaminopropylamine, diethylenetriamine, and N-aminoethylpiperazine.

The polyamides used in the present invention have equivalent weights up to about 5,000 and have at least two terminal amine groups per molecule. Polyamides are produced by known methods, lypically by the reaction of an excess of a polyamine or ammonia (as detailed above) with a polycarboxylic acid (also detailed above). The preferred polyamides include the reaction product of hexamethylenediamine and adipic acid.

The epoxy resin prepolymers suitable for use in this invention include diglycidyl ethers of bisphenol A, phenol-novolac epoxy resins, bisphenol F epoxy resins, polynuclear phenol-glycidyl ether-derived resins, and aliphatic glycidyl ethers.

An epoxy resin that can be used in the composition has the formula

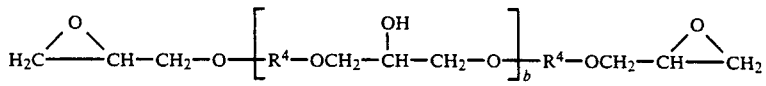

where b is a positive integer of about 0.5 to 4. Preferably, the epoxy resin is the polymerization product of epichlorohydrin and bisphenol A. In a preferred epoxy resin, $R^4$ in the above formula is

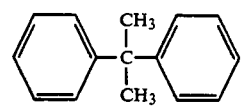

Typical of these preferred epoxy resins are "Epon" 828 having an equivalent weight of about 185–192 manufactured by Shell Chemical Company and DER 331 having an equivalent weight of about 182–190 manufactured by The Dow Chemical Company. The equivalent weight is the grams of resin that contain one gram equivalent of epoxide.

An epoxy novolac resin that can be used in the composition has the formula

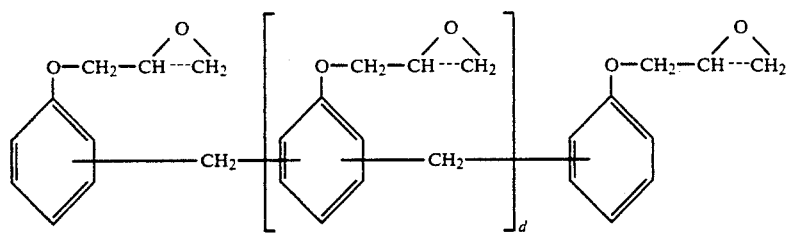

where d is a positive integer of about 0.2-2. Preferred epoxy novolac resins are DEN 431 where d has an average value of 0.2, DEN 438 where d has an average value of 1.6 and DEN 439 where d has an average value of 1.8. These resins are manufactured by the Dow Chemical Company.

The process of the invention is carried out by the general procedure of contacting the chlorosulfonated olefin polymer with an amount of polyamine/polyamide and with an epoxy resin prepolymer. Although elevated temperatures would be effective, surprisingly, so too are ambient temperatures. The number of equivalents of polyamine/polyamide must be greater than the number of equivalents of sulfur present in the chlorosulfonated olefin polymer. This insures that free amino/amide groups are present to react further with epoxy resin prepolymer to form the epoxy resin product. The amount of epoxy resin prepolymer added is consequently based on the number of equivalents of polyamine/polyamide present minus the number of equivalents of sulfur present in the chlorosulfonated olefin polymer. The actual amount of the epoxy resin prepolymer will vary based on the type of epoxy resin prepolymer used, but enough prepolymer must be present to satisfy the limitations stated above regarding equivalents. In all cases at least 5% by weight of the prepolymer, based on the weight of the total composition, will be present.

The amount of chlorosulfonated olefin polymer present in the reactive composition can be as low as 5% by weight to accommodate the high molecular weights of some polyamines/polyamides. Conversely, the amount of chlorosulfonated olefin polymer present can be as high as 80 weight % when high molecular weight polyolefins are utilized, since fewer sulfonyl chloride groups are required to assure at least two sulfur groups per molecule. For the same reasons the amount of polyamine/polyamide present in the reactive composition ranges from 5-90% by weight wherein the equivalent ratio of the polyamine to sulfur in the chlorosulfonated olefin polymer is greater than 1:1. This insures that there are free amino/amide groups available for further reaction with the epoxy resin prepolymer. Similarly, there must be a sufficient number of epoxy moieties present to react with the free amino/amide groups present in the sulfonamide derivative formed by reaction of the chlorosulfonated olefin polymer with the polyamine/polyamide. Depending on the molecular weights of the epoxy resin prepolymer, polyamine/polyamide, and the chlorosulfonated olefin polymer this amount will vary, but in all cases it will be at least 5% by weight of the total composition.

The chlorosulfonated olefin polymer, polyamine/polyamide, and epoxy resin prepolymer may be contacted simultaneously to produce a reactive composition which then reacts to form the product polyepoxy resin compositions of the invention. Optionally, a tertiary amine may be present, in amounts of 0.1-2 equivalents per equivalent of sulfur present in the chlorosulfonated olefin polymer, to act as an acid scavenger. The process may be run in the absence or in the presence of an inert solvent such as toluene, xylene, methyl ethyl ketone, or methyl isobutyl ketone, or in the melt at elevated temperatures. The viscosity of the reaction mixture will determine whether use of a solvent or elevated temperature is necessary or desirable. The tertiary amine component may function as an acid acceptor for the reaction between the chlorosulfonated olefin polymer and the polyamine/polyamide and as the catalyst for the reaction between the polyamine/polyamide and epoxy resin prepolymer. Tertiary amines which are preferred for use in the present invention must be compounds or mixtures of compounds which have a Kb of at least $2 \times 10^{-9}$. Suitable tertiary amines include such compounds as trimethylamine, triethylamine, tributylamine, N-methylmorpholine, N-ethylmorpholine, N-cocomorpholine, and 1,4-diazabicyclo-(2,2,2)octane. The preferred tertiary amines are triethylamine, tributylamine, and triethanolamine.

In another preferred embodiment of the process of the invention, the polyepoxy resin compositions may be prepared by first reacting the chlorosulfonated olefin polymer with excess polyamine/polyamide to produce a mixture of an intermediate sulfonamide derivative and polyamine/polyamide. The mixture is then subsequently reacted with an epoxy resin prepolymer to form the final polyepoxy resin composition. In this embodiment 10-80% by weight of the chlorosulfonated olefin polymer, based on the total weight of the composition, is reacted with 5-90% by weight of the polyamine, based on the total weight of the composition, wherein the equivalent ratio of the polyamine/polyamide to sulfur in the chlorosulfonated olefin polymer is greater than 1:1. The sulfonamide derivative formed is then combined with at least 5% by weight of an epoxy resin prepolymer, based on the weight of the total composition, which is the amount of epoxy resin prepolymer about equal to the equivalents of the polyamine/polyamide minus the equivalents of sulfur contained in the chlorosulfonated olefin polymer. It is also optional in this embodiment to use 0.1-2 equivalents of a tertiary amine, per equivalent of sulfur present in the chlorosulfonated olefin, as an acid scavenger.

In a further embodiment of the process of the invention a portion of the chlorosulfonyl groups present in the chlorosulfonated olefin polymer may be pre-reacted with a derivatizing agent prior to reaction with polyamine/polyamide and the epoxy resin prepolymer. Compounds useful for this purpose are primary and secondary monoamines and monohydric alcohols. The primary and secondary amines can be chosen from the classes of aliphatic, alicyclic, and aromatic amines which include methylamine, ethylamine, propylamine, aniline, ethanolamine, diethanolamine, N-methylethanolamine, and the like. The monofunctional alcohol derivatizing agents that can be used include any aliphatic, alicyclic or aromatic monofunctional alcohol, such as methanol, ethanol, isopropanol, octanol, benzyl alcohol, and cyclohexanol. Generally, about 0.1 to about 1 equivalent of derivatizing agent are used per equivalent of sulfur present in the chlorosulfonated olefin polymer. Following reaction of the derivatizing agent with the chlorosulfonated olefin polymer, the resultant composition is further reacted via a combination of substitution and transamidation with 5–90% by weight, based on the weight of the total composition, of one of the above-described polyamines/polyamides, and at least 5% by weight, based on the weight of the total composition, of one of the above-described epoxy resin prepolymers to form a resin composition of the invention. Monohydric alcohols may be used in excess in this embodiment to act both as derivatizing agents and as solvents. In this case the reaction of the chlorosulfonated olefin polymer derivative with polyamine/polyamide is totally by substitution.

The compositions formed in the process of the invention are useful for forming coating compositions, adhesives, thermoset resins, membranes, and reaction injection molding compositions.

EXAMPLES

The examples which follow are submitted to illustrate and not to limit this invention. All parts and percentages are on a weight basis unless otherwise indicated. Tensile strength and elongation at break data were determined according to ASTM D-412.

COMPARATIVE EXAMPLE 1

75.0 g of an epoxy resin prepolymer, Epon® 838 Bisphenol A epoxy resin, having an epoxy equivalent weight of 188, (0.40 equivalents), available from Shell Chemical Co., was mixed with 50 g of toluene. To this mixture was added a mixture of 25.4 g of isophoronediamine, (0.30 equivalents), and 54 g of isopropyl alcohol. The mixture was stirred for several minutes. The viscosity increased to 224 centipoise in less than 1 hour. The solution was then drawn down on Teflon®fluorocarbon resin film to form 20 mil films. The films were allowed to dry and crosslink at room temperature for a minimum of 7 days. After this time, the weight percent insolubles was determined to be 90% by extraction of the films with acetone for a minimum of 4 hours. The films were so brittle that tensile strengths could not be measured according to ASTM D-412.

COMPARATIVE EXAMPLE 2

Using the same procedure as described in Comparative Example 1, 75 g (0.40 equivalents) of the epoxy resin prepolymer of Comparative Example 1 was mixed with 50 g toluene, 33.9 g isophoronediamine (0.40 equivalents) and 72 g isopropanol. The films obtained were too brittle for tensile strengths to be determined according to ASTM D-412.

EXAMPLE 3

100 g of a 71% solids solution of chlorosulfonated polyethylene [chlorine content 46.5%, sulfur content 2.7%, prepared from a polyethylene base resin having a number average molecular weight of 5,000 (AC-6® polyethylene, available from Allied-Signal Corp.)] (0.06 equivalents sulfur) in toluene was mixed with 71 g of an epoxy resin prepolymer, Epon® 838 Bisphenol A epoxy resin, having an epoxy equivalent weight of 188, (0.38 equivalents), available from Shell Chemical Co., and 30 g of toluene. A second solution was prepared by mixing 37.2 g (0.44 equivalents) isophoronediamine and 79 g of isopropyl alcohol. The diamine/isopropyl alcohol solution was then gradually added to the chlorosulfonated polyolefin/epoxy solution over a 5 minute time period. A rise in the solution temperature of 3°–5° C. was observed. The initial solution viscosity was measured with a Brookfield viscometer. When the viscosity had increased to at least twice the initial viscosity, several 20 mil draw-downs onto Teflon® fluorocarbon resin film were prepared. The films were allowed to dry and crosslink at room temperature for a minimum of 7 days. After this time a film sample was extracted with acetone in a Soxhlet extractor for a minimum of 4 hours to determine the weight percent insolubles which were found to be 77%. This example illustrates the process of the invention wherein the reactive components are contacted simultaneously.

EXAMPLE 4

100 g of a 71% solids solution of chlorosulfonated polyethylene [chlorine content 46.5%, sulfur content 2.7%, prepared from a polyethylene base resin having a number average molecular weight of 5,000 (AC-6® polyethylene, available from Allied-Signal Corp.)] (0.06 equivalents sulfur) in toluene was mixed with 30.5 g of an epoxy resin prepolymer, Epon® 838 Bisphenol A epoxy resin, having an epoxy equivalent weight of 188, (0.16 equivalents), available from Shell Chemical Co., and 30 g toluene. A second solution was prepared by mixing 19.0 g (0.22 equivalents) isophoronediamine and 40 g of isopropyl alcohol. The diamine/isopropyl alcohol solution was then gradually added to the chlorosulfonated polyolefin/epoxy solution. When the viscosity had increased to at least twice the initial viscosity, several 20 mil draw-downs onto Teflon® fluorocarbon resin film were prepared. The films were allowed to dry and crosslink at room temperature for a minimum of 7 days. After this time a film sample was extracted with acetone in a Soxhlet extractor for a minimum of 4 hours to determine the weight percent insolubles which were found to be 71.9%. Tensile strength at break was 11.5 MPa and elongation at break was 30%. This example and those which follow illustrate the improvement in flexibility of the amine-crosslinked epoxy resin which is obtained by incorporation of chlorosulfonated olefin polymer.

EXAMPLE 5

100 g of a 71% solids solution of chlorosulfonated polyethylene [chlorine content 46.5%, sulfur content 2.7%, prepared from a polyethylene base resin having a number average molecular weight of 5,000 (AC-6® polyethylene, available from Allied-Signal Corp.)] (0.06 equivalents sulfur) in toluene was mixed with 7.9 g of an epoxy resin prepolymer, Epon® 838 Bisphenol A epoxy resin, having an epoxy equivalent weight of 188, (0.04 equivalents), available from Shell Chemical Co., and 30 g of toluene. A second solution was prepared by mixing 8.8 g (0.10 equivalents) isophoronediamine and 19 g of isopropyl alcohol. The diamine/isopropyl alcohol solution was then gradually added to the chlorosulfonated polyolefin/epoxy solution. When the viscosity had increased to at least twice the initial viscosity, several 20 mil draw-downs onto Teflon ® fluorocarbon resin film were prepared. The films were allowed to dry and crosslink at room temperature for a minimum of 7 days. After this time a film sample was extracted with acetone in a Soxhlet extractor for a minimum of 4 hours to determine the weight percent insolubles which were found to be 65.5%. Tensile strength at break was 9.3 MPa and elongation at break was 108%.

EXAMPLE 6

100 g of a 71% solids solution of chlorosulfonated polyethylene [chlorine content 46.5%, sulfur content 2.7%, prepared from a polyethylene base resin having a number average molecular weight of 5,000 (AC-6 ® polyethylene, available from Allied-Signal Corp.)] (0.06 equivalents sulfur) in toluene was mixed with 71 g of an epoxy resin prepolymer, Epon ® 838 Bisphenol A epoxy resin, having an epoxy equivalent weight of 188, (0.38 equivalents), available from Shell Chemical Co., and 30 g toluene. A second solution was prepared by mixing 18.7 g (0.22 equivalents) isophoronediamine and 39 g of isopropyl alcohol. The diamine/isopropyl alcohol solution was then gradually added to the chlorosulfonated polyolefin/epoxy solution. When the viscosity had increased to at least twice the initial viscosity, several 20 mil draw-downs onto Teflon ® fluorocarbon resin film were prepared. The films were allowed to dry and crosslink at room temperature for a minimum of 7 days. After this time a film sample was extracted with acetone in a Soxhlet extractor for a minimum of 4 hours to determine the weight percent insolubles which were found to be 81%. Tensile strength at break was 17.8 MPa and elongation at break was 19%.

EXAMPLE 7

100 g of a 71% solids solution of chlorosulfonated polyethylene [chlorine content 46.5%, sulfur content 2.7%, prepared from a polyethylene base resin having a number average molecular weight of 5,000 (AC-6 ® polyethylene, available from Allied-Signal Corp.)] (0.06 equivalents sulfur) in toluene was mixed with 30.5 g of an epoxy resin prepolymer, Epon ® 838 Bisphenol A epoxy resin, having an epoxy equivalent weight of 188, (0.16 equivalents), available from Shell Chemical Co., and 30 g toluene. A second solution was prepared by mixing 9.5 g (0.11 equivalents) isophoronediamine and 20 g of isopropyl alcohol. The diamine/isopropyl alcohol solution was then gradually added to the chlorosulfonated polyolefin/epoxy solution. When the viscosity had increased to at least twice the initial viscosity, several 20 mil draw-downs onto Teflon ® fluorocarbon resin film were prepared. The films were allowed to dry and crosslink at room temperature for a minimum of 7 days. After this time a film sample was extracted with acetone in a Soxhlet extractor for a minimum of 4 hours to determine the weight percent insolubles which were found to be 76%. Tensile strength at break was 15.3 MPa and elongation at break was 55%.

EXAMPLE 8

100 g of a 71% solids solution of chlorosulfonated polyethylene [chlorine content 46.5%, sulfur content 2.7%, prepared from a polyethylene base resin having a number average molecular weight of 5,000 (AC-6 ® polyethylene, available from Allied-Signal Corp.)] (0.06 equivalents sulfur) in toluene was mixed with 7.9 g of an epoxy resin prepolymer, Epon ® 838 Bisphenol A epoxy resin, having an epoxy equivalent weight of 188, (0.04 equivalents), available from Shell Chemical Co., and 30 g toluene. A second solution was prepared by mixing 4.4 g (0.05 equivalents) isophoronediamine and 9 g of isopropyl alcohol. The diamine/isopropyl alcohol solution was then gradually added to the chlorosulfonated polyolefin/epoxy solution. When the viscosity had increased to at least twice the initial viscosity, several 20 mil draw-downs onto Teflon ® fluorocarbon resin film were prepared. The films were allowed to dry and crosslink at room temperature for a minimum of 7 days. After this time a film sample was extracted with acetone in a Soxhlet extractor for a minimum of 4 hours to determine the weight percent insolubles which were found to be 64.2%. Tensile strength at break was 11.8 MPa and elongation at break was 84%.

EXAMPLE 9

100 g of a 14.6% solids solution of chlorosulfonated polyethylene [chlorine content 43%, sulfur content 1.0%, prepared from a polyethylene base resin having a number average molecular weight of 20,000] (0.005 equivalents sulfur) in toluene was mixed with 14.6 g of an epoxy resin prepolymer, Epon ® 838 Bisphenol A epoxy resin, having an epoxy equivalent weight of 188, (0.08 equivalents), available from Shell Chemical Co., and 30 g toluene. A second solution was prepared by mixing 7 g (0.08 equivalents) isophoronediamine and 15 g of isopropyl alcohol. The diamine/isopropyl alcohol solution was then gradually added to the chlorosulfonated polyolefin/epoxy solution. When the viscosity had increased to at least twice the initial viscosity, several 20 mil draw-downs onto Teflon ® fluorocarbon resin film were prepared. The films were allowed to dry and crosslink at room temperature for a minimum of 7 days. After this time a film sample was extracted with acetone in a Soxhlet extractor for a minimum of 4 hours to determine the weight percent insolubles which were found to be 70.4%. Tensile strength at break was 12.9 MPa and elongation at break was 25%.

EXAMPLE 10

100 g of a 14.6% solids solution of chlorosulfonated polyethylene [chlorine content 43%, sulfur content 1.0%, prepared from a polyethylene base resin having a number average molecular weight of 20,000] (0.005 equivalents sulfur) in toluene was mixed with 6.3 g of an epoxy resin prepolymer, Epon ® 838 Bisphenol A epoxy resin, having an epoxy equivalent weight of 188, (0.04 equivalents), available from Shell Chemical Co., and 30 g toluene. A second solution was prepared by mixing 3.2 g (0.04 equivalents) isophoronediamine and 7g of isopropyl alcohol. The diamine/isopropyl alcohol solution was then gradually added to the chlorosulfonated polyolefin/epoxy solution. When the viscosity had increased to at least twice the initial viscosity, several 20 mil draw-downs onto Teflon ® fluorocarbon resin film were prepared. The films were allowed to dry and crosslink at room temperature for a minimum of 7 days. After this time a film sample was extracted with acetone in a Soxhlet extractor for a minimum of 4 hours to determine the weight percent insolubles which were found to be 73.8%. Tensile strength at break was 11.6 MPa and elongation at break was 82%.

EXAMPLE 11

100 g of a 14.6% solids solution of chlorosulfonated polyethylene [chlorine content 43%, sulfur content 1.0%, prepared from a polyethylene base resin having a number average molecular weight of 20,000] (0.005 equivalents sulfur) in toluene was mixed with 14.6 g of an epoxy resin prepolymer, Epon ® 838 Bisphenol A epoxy resin, having an epoxy equivalent weight of 188, (0.08 equivalents), available from Shell Chemical Co., and 30 g toluene. A second solution was prepared by mixing 5.2 g (0.06 equivalents) isophoronediamine and 11 g of isopropyl alcohol. The diamine/isopropyl alcohol solution was then gradually added to the chlorosulfonated polyolefin/epoxy solution. When the viscosity had increased to at least twice the initial viscosity, several 20 mil draw-downs onto Teflon ® fluorocarbon resin film were prepared. The films were allowed to dry and crosslink at room temperature for a minimum of 7 days. After this time a film sample was extracted with acetone in a Soxhlet extractor for a minimum of 4 hours to determine the weight percent insolubles which were found to be 74.4%. Tensile strength at break was 13.1 MPa and elongation at break was 32%

EXAMPLE 12

100 g of a 14.6% solids solution of chlorosulfonated polyethylene [chlorine content 43%, sulfur content 1.0%, prepared from a polyethylene base resin having a number average molecular weight of 20,000] (0.005 equivalents sulfur) in toluene was mixed with 6.3 g of an epoxy resin prepolymer, Epon ®838 Bisphenol A epoxy resin, having an epoxy equivalent weight of 188, (0.04 equivalents), available from Shell Chemical Co., and 30 g toluene. A second solution was prepared by mixing 2.4 g (0.03 equivalents) isophoronediamine and 5 g of isopropyl alcohol. The diamine/isopropyl alcohol solution was then gradually added to the chlorosulfonated polyolefin/epoxy solution. When the viscosity had increased to at least twice the initial viscosity, several 20 mil draw-downs onto Teflon ® fluorocarbon resin film were prepared. The films were allowed to dry and crosslink at room temperature for a minimum of 7 days. After this time a film sample was extracted with acetone in a Soxhlet extractor for a minimum of 4 hours to determine the weight percent insolubles which were found to be 73.2%. Tensile strength at break was 11.0 MPa and elongation at break was 104%.

EXAMPLE 13

100 g of a 65% solids solution of chlorosulfonated polyethylene [chlorine content 46.5%, sulfur content 2.7%, prepared from a polyethylene base resin having a number average molecular weight of 5,000 (AC-6 ® polyethylene, available from Allied-Signal Corp.)] (0.05 equivalents sulfur) in toluene was added slowly, with stirring, to a mixture of 27.0 g (0.32 equivalents) of isophoronediamine and 27 g of isopropyl alcohol. The reaction temperature increased approximately 12° C. during the addition. The mixture was stirred for an additional 12 hours. During this time the viscosity increased from 1100 centipoise to 2250 centipoise. 50.7 g (0.27 equivalents) of an epoxy resin prepolymer, Epon ® 838 Bisphenol A epoxy resin, having an epoxy equivalent weight of 188, (0.04 equivalents), available from Shell Chemical Co., was then added. The mixture was allowed to react for 30 minutes and then several 20 mil draw-downs on Teflon ® fluorocarbon resin film were prepared. The draw-downs were allowed to dry and crosslink at room temperature for a minimum of 7 days. This example illustrates formation of an intermediate sulfonamide followed by reaction with the epoxy resin prepolymer.

EXAMPLE 14

100 g of a 65% solids solution of chlorosulfonated polyethylene [chlorine content 46.5%, sulfur content 2.7%, prepared from a polyethylene base resin having a number average molecular weight of 5,000 (AC-6 ® polyethylene, available from Allied-Signal Corp.)] (0.05 equivalents sulfur) in toluene was further diluted with 50 g of methyl ethyl ketone. To the mixture was added 3.1 g of isopropyl alcohol (0.05 equivalents) and 9.5 g of tributylamine for 1 hour to allow for complete formation of the isopropyl sulfonate ester. 65.0 g (0.35 equivalents) of an epoxy resin prepolymer, Epon ® 838 Bisphenol A epoxy resin, having an epoxy equivalent weight of 188, available from Shell Chemical Co. and 29.0 g (0.34 equivalents) of isophoronediamine were then added. The mixture was allowed to stir for several hours at room temperature. During this time the viscosity of the solution increased from 128 centipoise to over 600 centipoise. Several 20 mil draw-downs on Teflon ® fluorocarbon resin film were prepared and allowed to dry and crosslink at room temperature for a minimum of 7 days. Weight % insolubles by acetone extraction were then determined and were found to be 70%. This example illustrates formation of a chlorosulfonated olefin polymer derivative with subsequent reaction with polyamine and epoxy resin prepolymer.

COMPARATIVE EXAMPLE 15

50 g of an epoxy resin prepolymer, Epon ® 838 Bisphenol A epoxy resin, having an epoxy equivalent weight of 188, (0.27 equivalents), available from Shell Chemical Co., was mixed with 27 g of methyl ethylketone. To this mixture was added a mixture of 27 g (0.27 equivalents) of a polyamine condensation product having an equivalent weight of 100 (Versamid ® 150 Polyamide Resin, available from Henkel Chemical Co.). The viscosity increased to 500 centipoise in 10 min. The solution was then drawn down on Teflon ® fluorocarbon resin film to form 20 mil films. The films were allowed to dry and crosslink at room temperature for a minimum of 7 days. After this time, the weight percent insolubles was determined to be 91% by extraction of the films with acetone for a minimum of 4 hours. The films were so brittle that tensile strengths could not be measured using ASTM D-412.

EXAMPLE 16

100 g of a 20% solids solution of chlorosulfonated polyethylene [chlorine content 46.5%, sulfur content 1.6%, prepared from a polyethylene base resin having a number average molecular weight of 5,000 (AC-6 ® polyethylene, available from Allied-Signal Corp.)] (0.01 equivalents sulfur) in toluene was mixed with 50 g of an epoxy resin prepolymer, Epon ® 838 Bisphenol A epoxy resin, having an epoxy equivalent weight of 188, (0.27 equivalents), available from Shell Chemical Co., and 30 g of toluene. A second solution was prepared by mixing 27 g (0.27 equivalents) of a polyamine condensation product having an equivalent weight of 100 (Versamid ® 150 Polyamide Resin, available from Henkel Chemical Co.) and 50 g of isopropyl alcohol. The diamine/isopropyl alcohol solution was then gradually added to the chlorosulfonated polyolefin/epoxy solution over a 10 minute time period. A rise in the solution temperature of 3°–5° C. was observed. The initial solution viscosity was measured with a Brookfield viscometer. When the viscosity had increased to at least twice the initial viscosity, several 20 mil draw-downs onto Teflon® fluorocarbon resin film were prepared. The films were allowed to dry and crosslink at room temperature for a minimum of 7 days. After this time a film sample was extracted with acetone in a Soxhlet extractor for a minimum of 4 hours to determine the weight percent insolubles which were polyamine condensation product as a reactant in the formation of a chlorosulfonated olefin polymer of the invention.

EXAMPLE 17 polyethylene [chlorine content 46.5%, sulfur content 1.6%, prepared from a polyethylene base resin having a number average molecular weight of 5,000 (AC-6® polyethylene, available from Allied-Signal Corp.)] (0.02 equivalents sulfur) in toluene was mixed with 50 g of an epoxy resin prepolymer, Epon® 838 Bisphenol A epoxy resin, having an epoxy equivalent weight of 188, (0.27 equivalents), available from Shell Chemical Co., and 30 g of toluene. A second solution was prepared by mixing 29 g (0.29 equivalents) of a polyamine condensation product having an equivalent weight of 100 (Versamid® 150 Polyamide Resin, available from Henkel Chemical Co.) and 25 g of isopropyl alcohol. The diamine/isopropyl alcohol solution was then gradually added to the chlorosulfonated polyolefin/epoxy solution over a 10 minute time period. A rise in the solution temperature of 3°-5° C. was observed. The initial solution viscosity was measured with a Brookfield viscometer. When the viscosity had increased to at least twice the initial viscosity, several 20 mil draw-downs onto Teflon® fluorocarbon resin film were prepared. The films were allowed to dry and crosslink at room temperature for a minimum of 7 days. After this time a film sample was extracted with acetone in a Soxhlet extractor for a minimum of 4 hours to determine the weight percent insolubles which were found to be 78%.

EXAMPLE 18

100 g of a 55% solids solution of chlorosulfonated ethylene/vinyl acetate copolymer (2500 melt index, 39.2% chlorine, 3.08% sulfur),(0.039 equivalents sulfur) in xylene was mixed with 27 g of isopropanol (0.45 equivalents) and 18.2 g (0.214 equivalents) of isophoronediamine. A slight increase in the solution viscosity was noted during the addition of the diamine/alcohol mixture. The resulting solution was then added to a mixture containing 55 g (0.29 equivalents) of an aromatic epoxy resin prepolymer (DER® 331 epoxy resin, available from The Dow Chemical Co.) having an equivalent weight of 188. When the viscosity of the mixture had increased to greater than 500 centipoise several 20 mil draw-downs were made onto Teflon® fluorocarbon resin film. The draw-downs were allowed to dry and crosslink at room temperature for a minimum of 7 days. After this time the film samples were removed from the Teflon® film and extracted with methyl ethyl ketone in a soxhlet extractor for a minimum of 4 hours. The percent insoluble material was determined to be 78.10%.

I claim:

1. A process for preparing a crosslinked epoxy resin composition which comprises, at ambient temperature in the absence of a bicyclic amidine:
   1) preparing a derivative by reacting:
      a) 5-80% by weight, based on the total weight of the composition, of a chlorosulfonated olefin polymer having a chlorine content of about 20-60% by weight and a sulfur content of about 0.5-10% by weight; with
      b) 0.1-1 equivalent, per equivalent of sulfur present in the chlorosulfonated olefin polymer, of a compound selected from the group consisting of primary and secondary monoamines, monohydric alcohols, and mixtures thereof; and
   2) further reacting the resultant derivative with:
      c) 5-90% by weight, based on the total weight of the composition, of a polyamide having at least two terminal amine groups per molecule, or a polyamine other than said polyamide, wherein the equivalent ratio of the polyamide having at least two terminal amine groups per molecule, or a polyamine other than said polyamide to sulfur in the chlorosulfonated olefin polymer is greater than 1:1 and the polyamide having at least two terminal amine groups per molecule, or a polyamine other than said polyamide has an equivalent weight up to 5,000; and with
      d) at least 5% by weight, based on the total weight of the composition, of an epoxy resin prepolymer; and with
      e) optionally, 0.1-2 equivalents, per equivalent of sulfur present in the chlorosulfonated olefin polymer, of a tertiary amine; wherein the epoxy resin is crosslinked with the chlorosulfonated olefin polymer via sulfonamide groups.

2. The process of claim 1, wherein the chlorosulfonated olefin polymer is selected from the group consisting of chlorosulfonated homopolymer of $C_2-C_8$ alpha monoolefins and chlorosulfonated copolymers of ethylene and at least one ethylenically unsaturated monomer selected from the group consisting of $C_3-C_{10}$ alpha monoolefins, $C_1-C_{12}$ alkyl esters of unsaturated $C_3-C_{20}$ monocarboxylic acids, unsaturated $C_3-C_{20}$ mono- or dicarboxylic acids, vinyl esters of saturated $C_2-C_{18}$ carboxylic acids, and carbon monoxide.

3. The process of claim 1, wherein the chlorosulfonated resin polymer is selected from the group consisting of chlorosulfonated polyethylene, chlorosulfonated polypropylene, chlorosulfonated ethylene vinyl acetate copolymers, chlorosulfonated ethylene acrylic acid copolymers, chlorosulfonated ethylene methacrylic acid copolymers, chlorosulfonated ethylene methyl acrylate copolymers, chlorosulfonated ethylene methyl methacrylate copolymers, chlorosulfonated ethylene n-butyl methacrylate copolymers, chlorosulfonated ethylene glycidyl methacrylate copolymers; and chlorosulfonated copolymers of ethylene with propylene, butene, 3-methyl-1-pentene and octene.

4. The process of claim 1 wherein the chlorosulfonated olefin polymer is chlorosulfonated polyethylene.

5. The process of claim 1 wherein the chlorosulfonated polyolefin is a chlorosulfonated ethylene vinyl acetate copolymer.

6. The process of claim 1, wherein the chlorosulfonated olefin polymer has a chlorine content of about 30-50% and a sulfur content of about 1-3%.

7. The process of claim 1, wherein the chlorosulfonated olefin polymer has a number average molecular weight of 1,000-5,000.

8. The process of claim 1 wherein the polyamine is isophoronediamine.

9. The process of claim 1 wherein the polyamide is the reaction product of an aliphatic or aromatic amine having two or more primary or secondary amino functionalities per molecule with a compound selected from the group consisting of saturated aliphatic polycarboxylic acids, cycloaliphatic polycarboxylic acids, and aromatic polycarboxylic acids.

* * * * *